US011795600B2

United States Patent
Shinde et al.

(10) Patent No.: US 11,795,600 B2
(45) Date of Patent: Oct. 24, 2023

(54) WASHER APPLIANCE HAVING REMOVABLE AGITATOR POST WITH RADIAL LOCKING FEATURES

(71) Applicant: Haier US Appliance Solutions, Inc., Wilmington, DE (US)

(72) Inventors: Jay Pareshbhai Shinde, Hyderabad (IN); Neki Jashwant Patel, Hyderabad (IN); Sanjay Yadav Majjath, Hyderabad (IN); Sanjana Tuniki, Hyderabad (IN); V V Subrahmanyeswara Rao Kasa, Hyderabad (IN); Sirish Yerramalli, Hyderabad (IN); Ravikumar Anburaj, Hyderabad (IN); Sankar Selvaraj, Hyderabad (IN); Tarun Guniganti, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 54 days.

(21) Appl. No.: 17/381,247

(22) Filed: Jul. 21, 2021

(65) Prior Publication Data
US 2023/0026944 A1 Jan. 26, 2023

(51) Int. Cl.
*D06F 37/24* (2006.01)
*F16B 7/04* (2006.01)
*D06F 37/40* (2006.01)
*D06F 23/04* (2006.01)

(52) U.S. Cl.
CPC .............. *D06F 37/24* (2013.01); *D06F 23/04* (2013.01); *D06F 37/40* (2013.01); *F16B 7/0406* (2013.01)

(58) Field of Classification Search
None
See application file for complete search history.

(56) References Cited

U.S. PATENT DOCUMENTS

| 1,755,419 | A | * | 4/1930 | Anderson | ............... D06F 13/00 366/276 |
|---|---|---|---|---|---|
| 3,213,651 | A | | 10/1965 | Worst | |
| 3,648,486 | A | | 3/1972 | Rosinski, Jr. | |
| 4,718,258 | A | | 1/1988 | Cuthbert | |
| 4,719,769 | A | | 1/1988 | Mueller | |
| 10,787,761 | B2 | | 9/2020 | Czarnecki | |
| 2020/0399811 | A1 | * | 12/2020 | Czarnecki | ............... D06F 13/00 |

* cited by examiner

*Primary Examiner* — Cristi J Tate-Sims
(74) *Attorney, Agent, or Firm* — Dority & Manning, P.A.

(57) ABSTRACT

A washing appliance with an agitator post configured for removable positioning in a receptacle. A shaft may be supported by the agitator post, the shaft rotatable relative to the agitator post. A plurality of movable tabs may be positioned at the bottom end of the agitator post and in mechanical communication with the shaft such that a direction of rotation of the shaft causes the plurality of movable tabs to be selectively movable along a radial direction between an extended position in contact with the receptacle that prevents rotation of the agitator post relative to the receptacle and a retracted position that allows rotation of the agitator post relative to the receptacle.

19 Claims, 10 Drawing Sheets

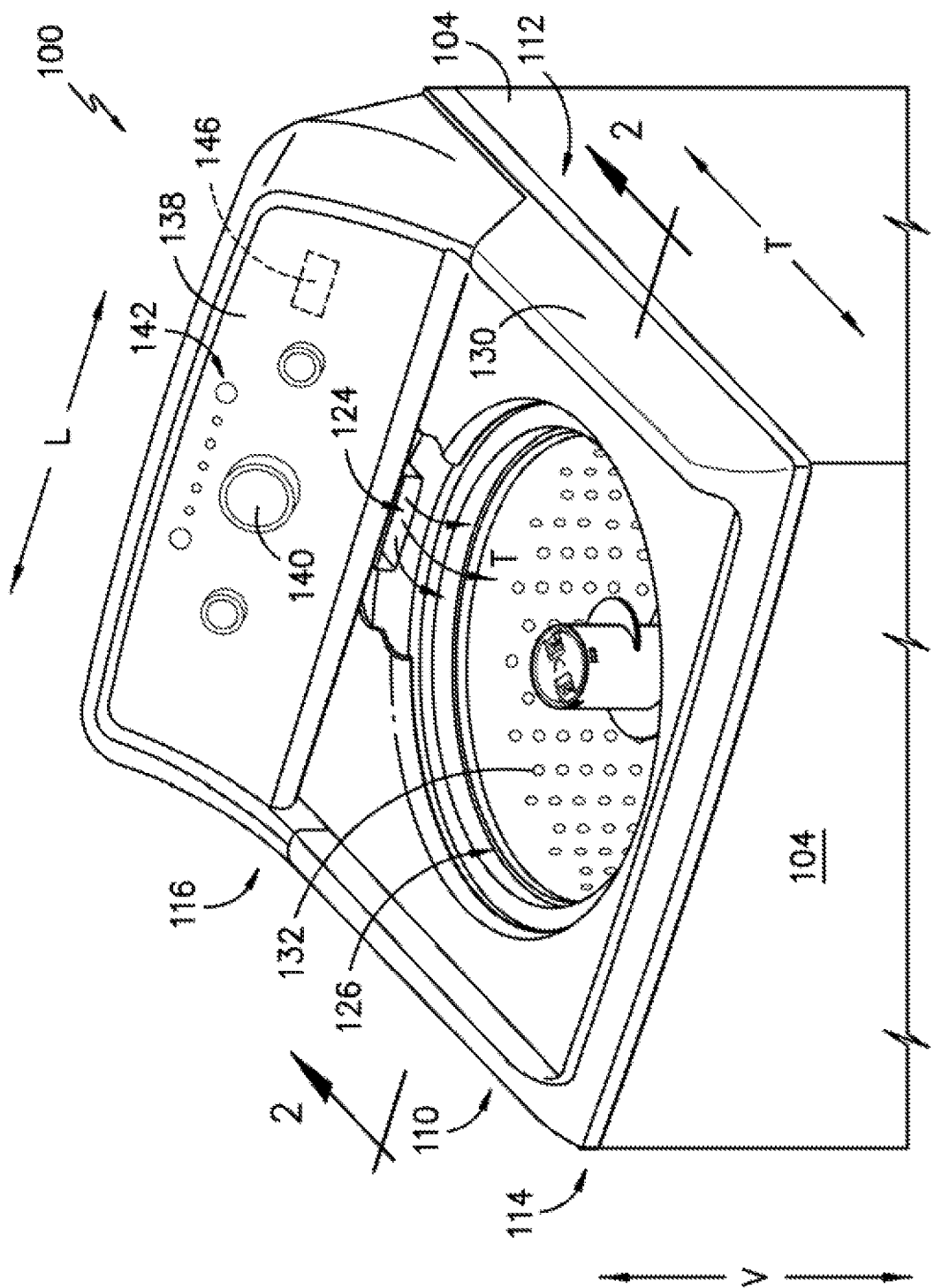
FIG. -1-

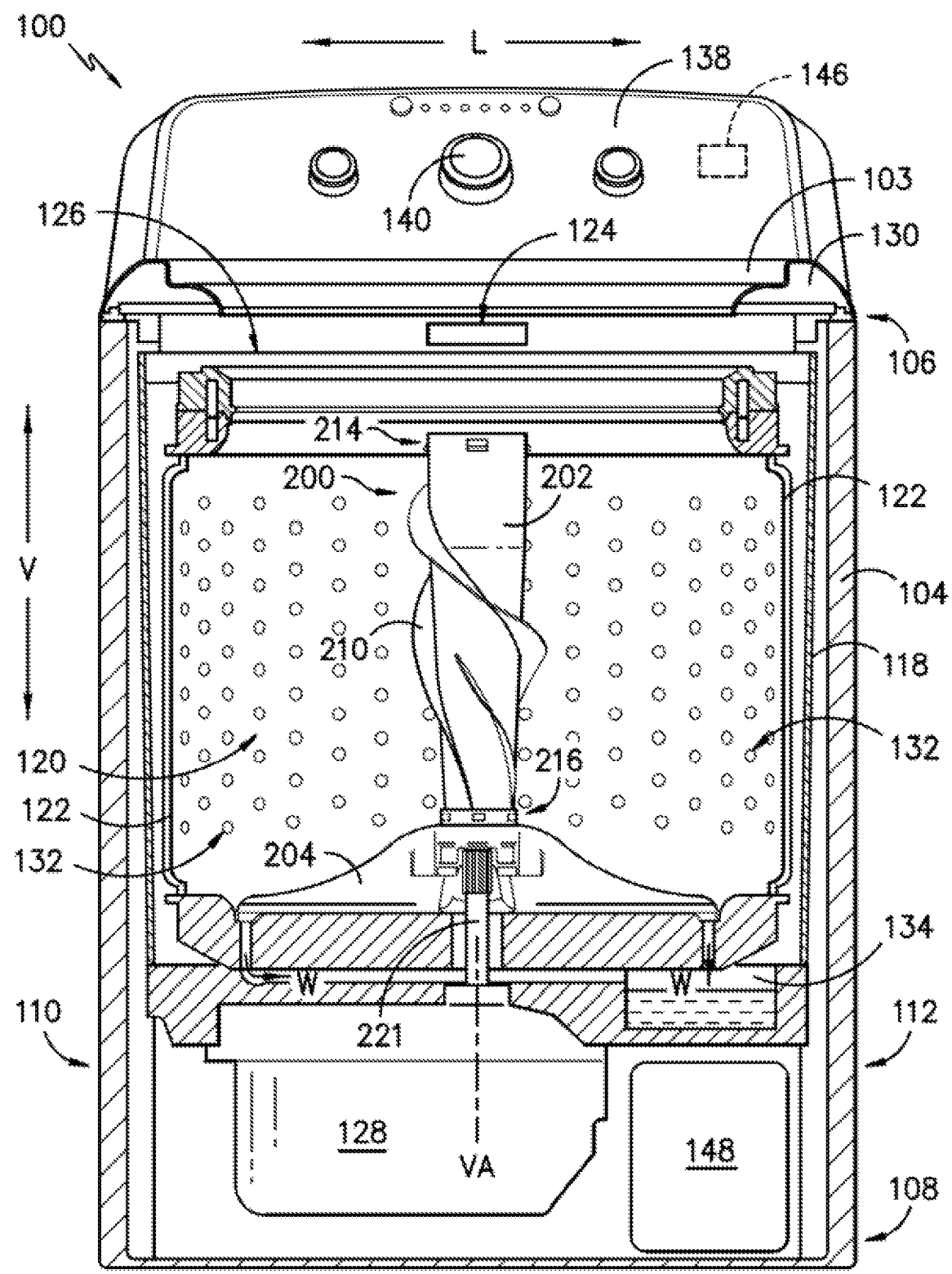
FIG. -2-

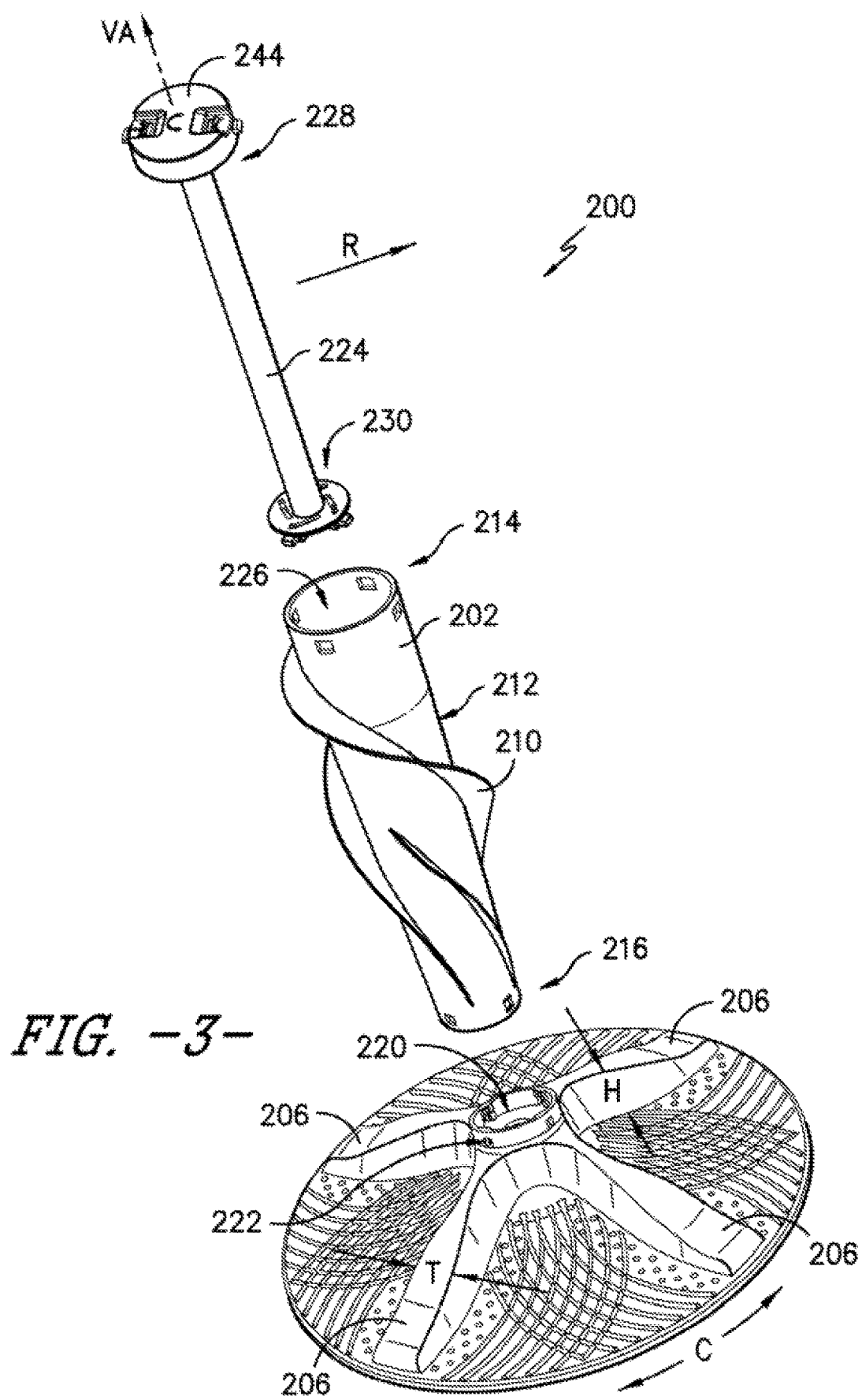
FIG. -3-

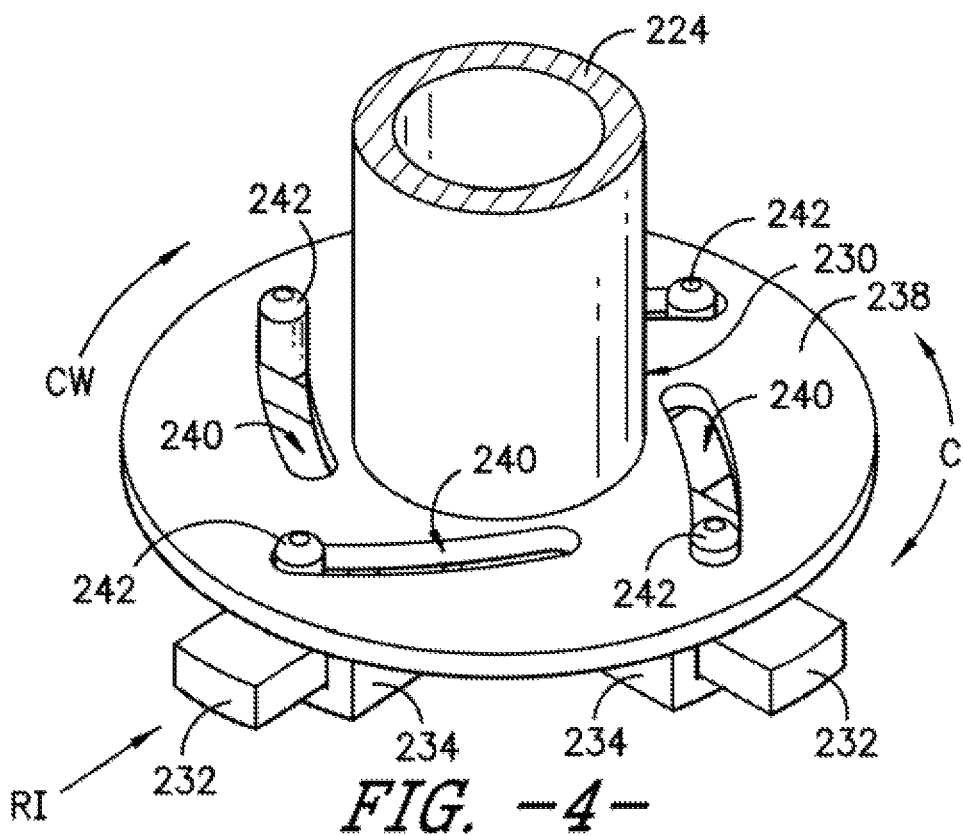
FIG. -4-
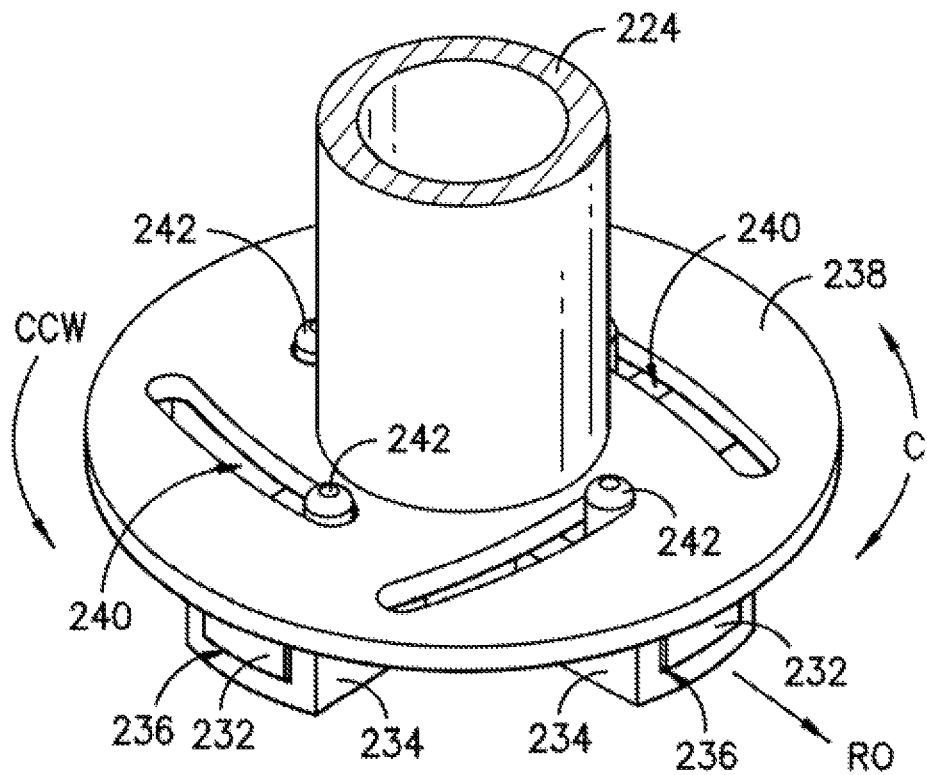
FIG. -5-

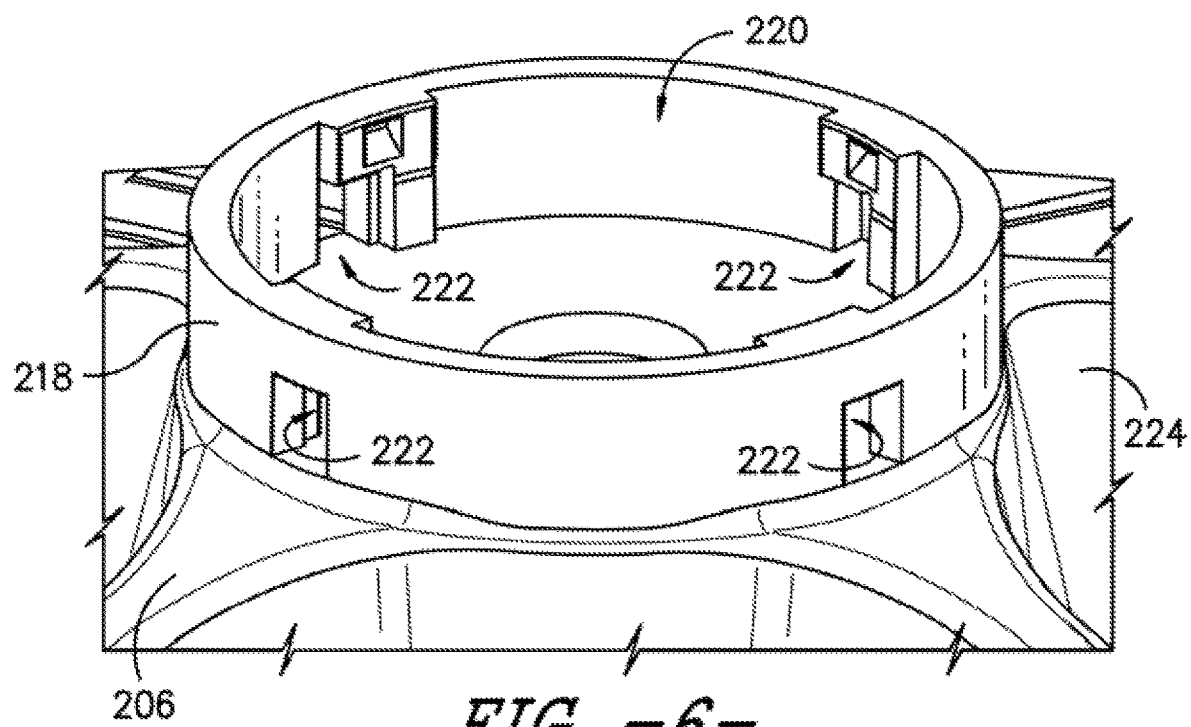
FIG. -6-
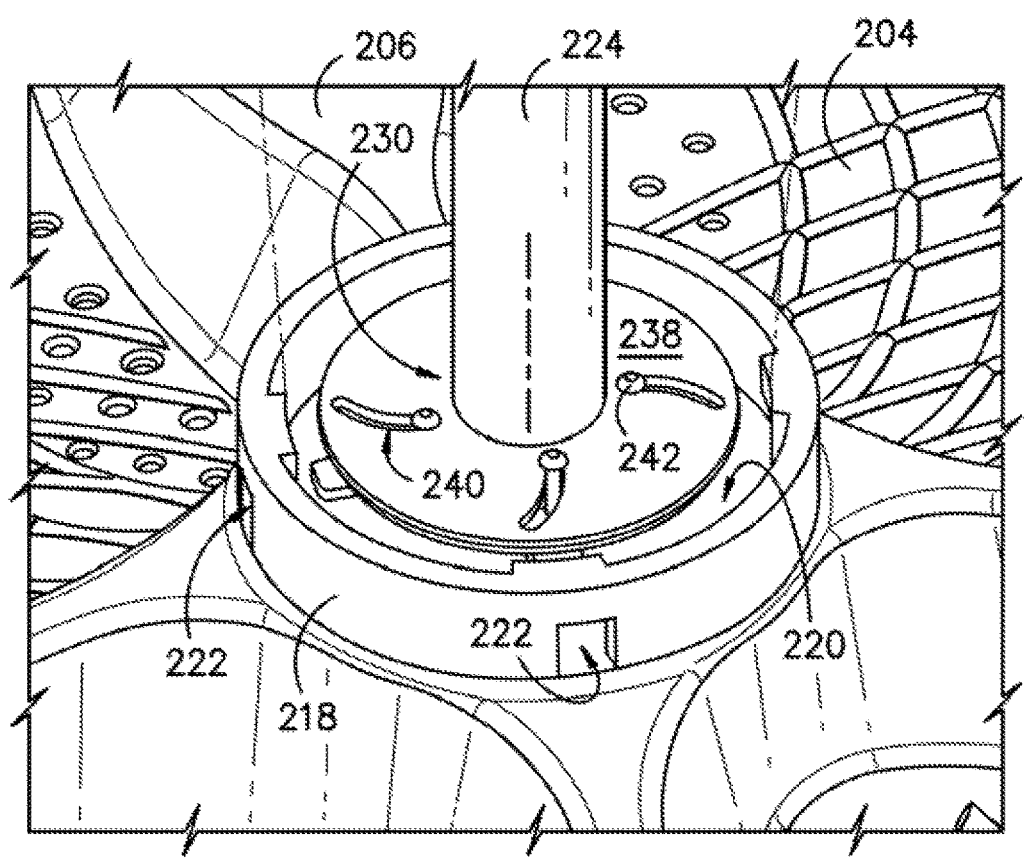
FIG. -7-

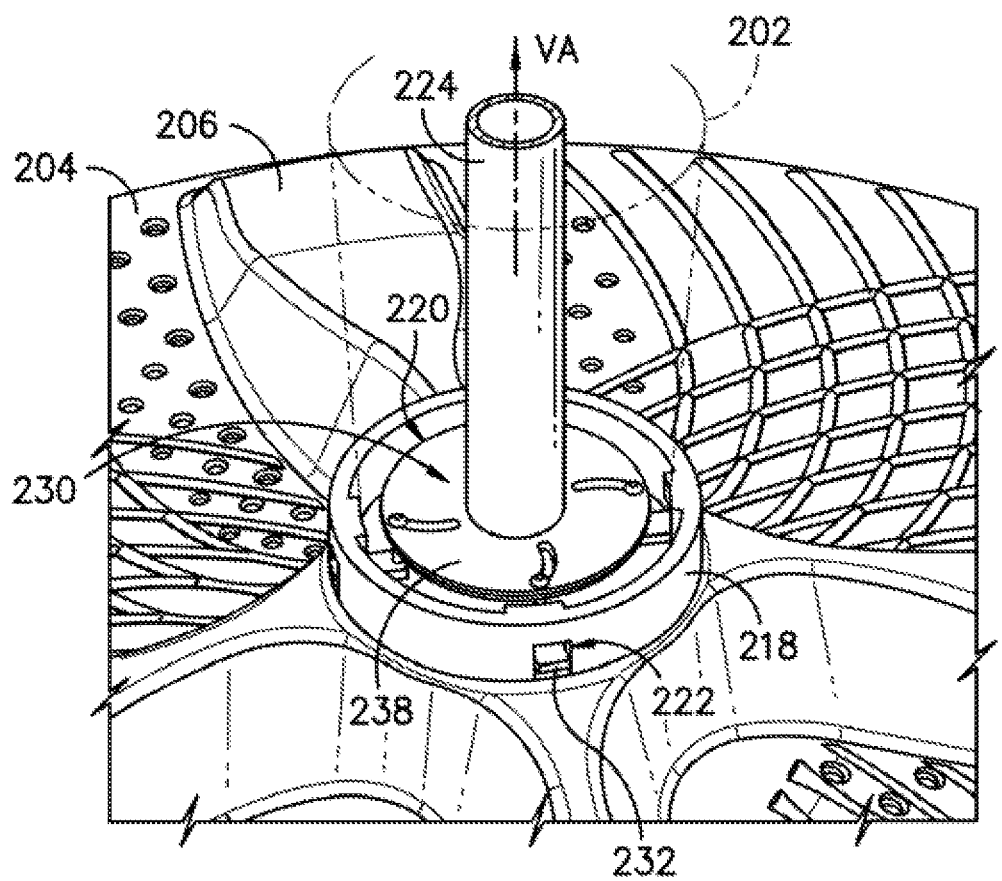
FIG. -8-
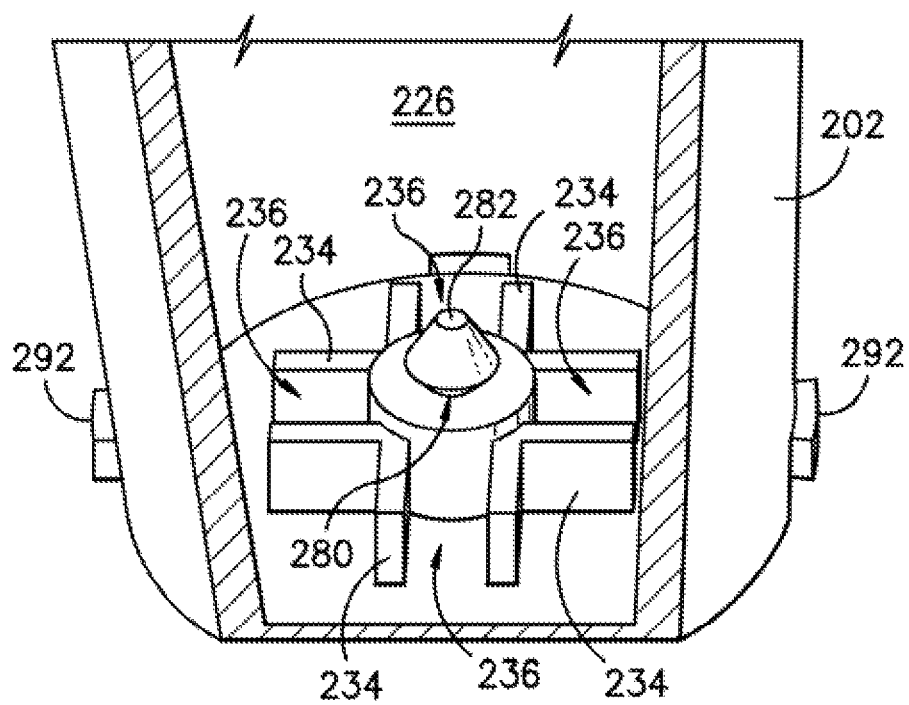
FIG. -9-

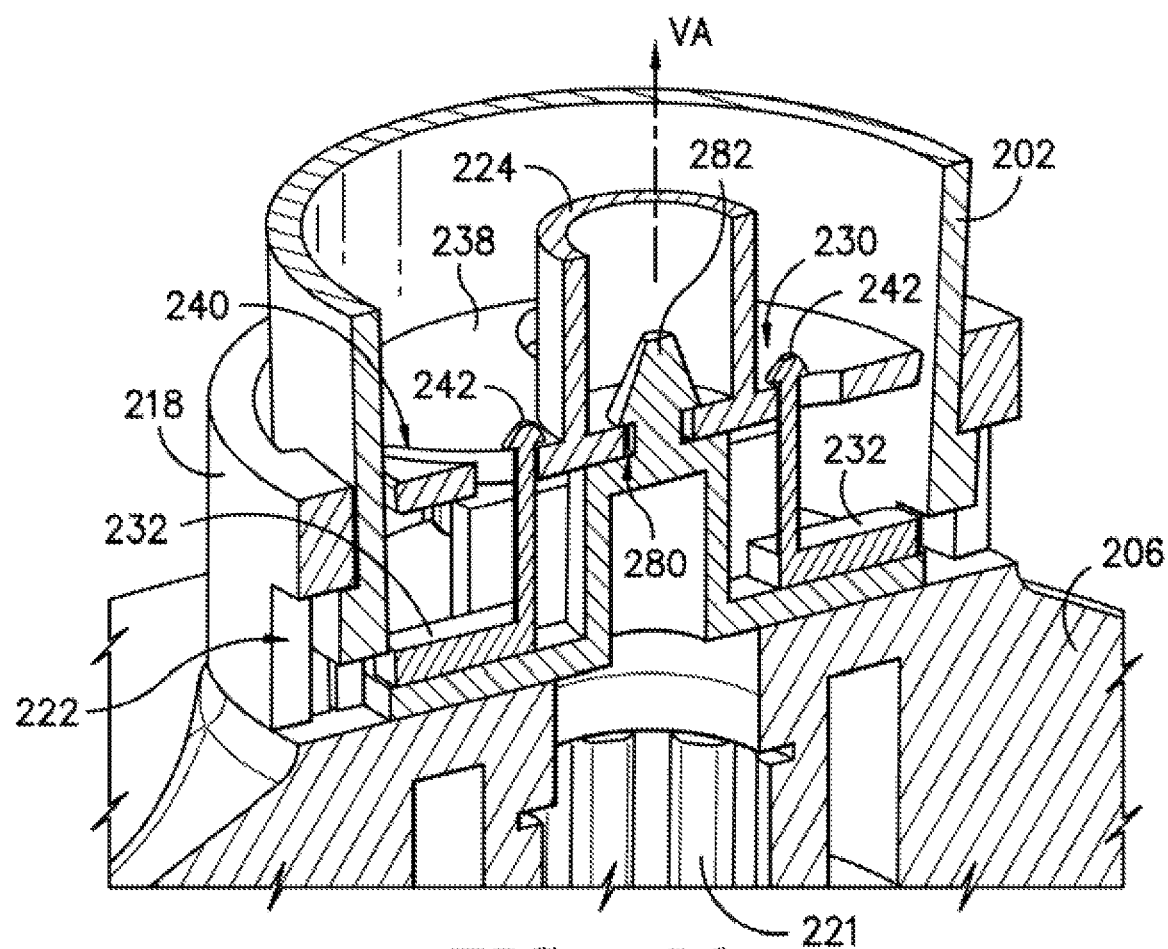
FIG. -10-
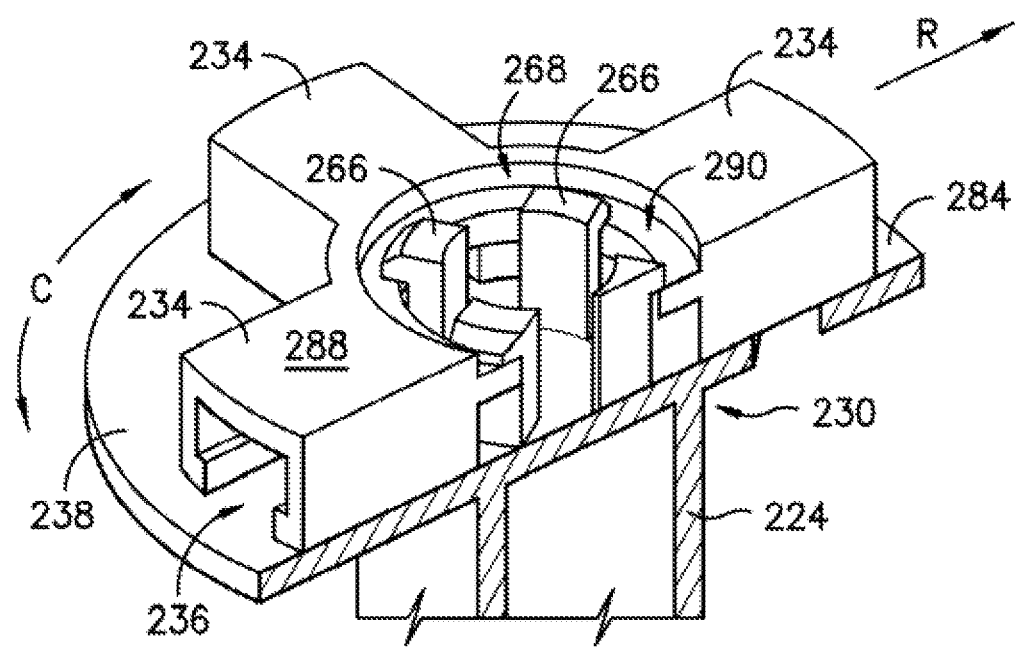
FIG. -11-

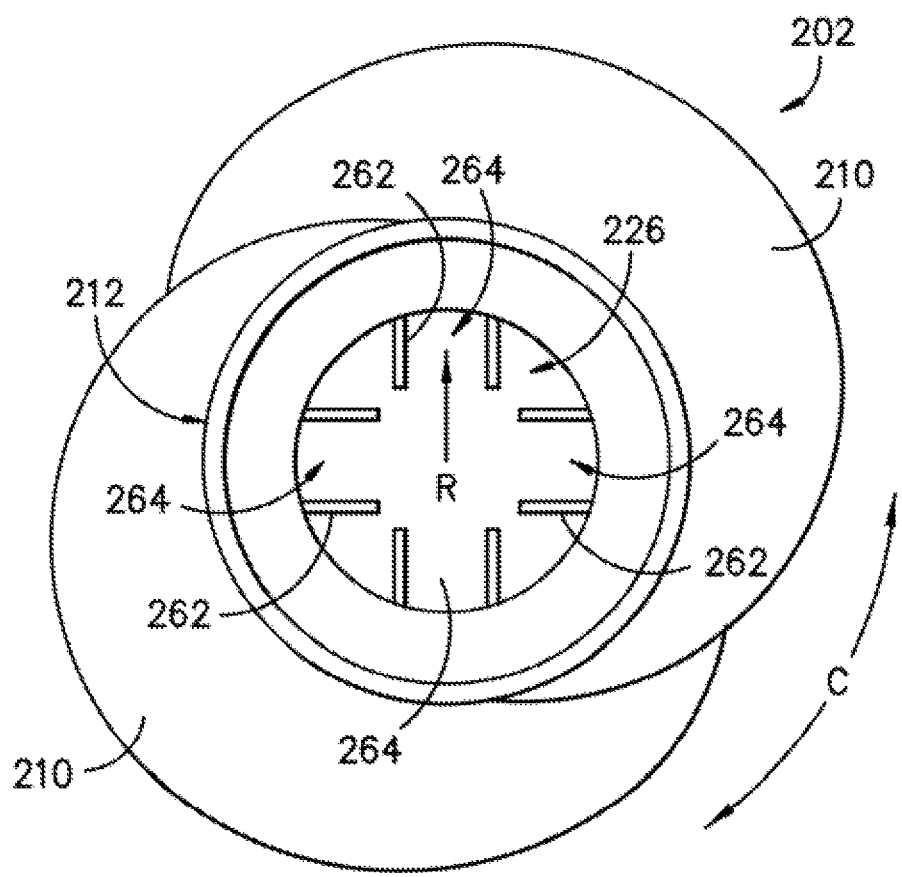
FIG. -12-
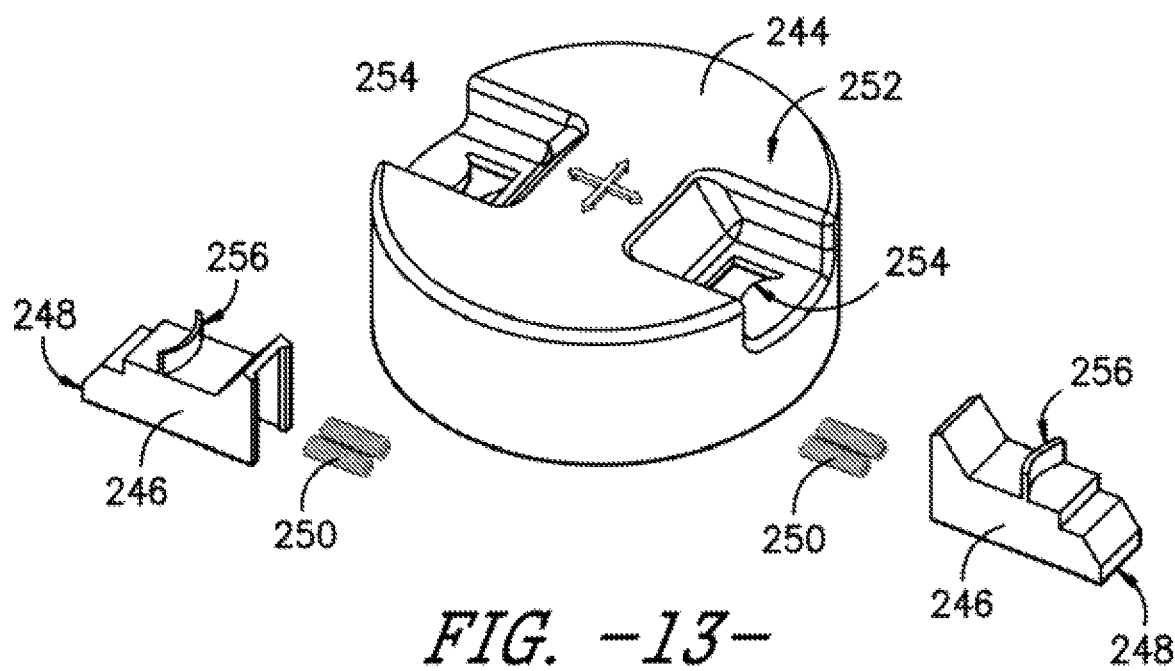
FIG. -13-

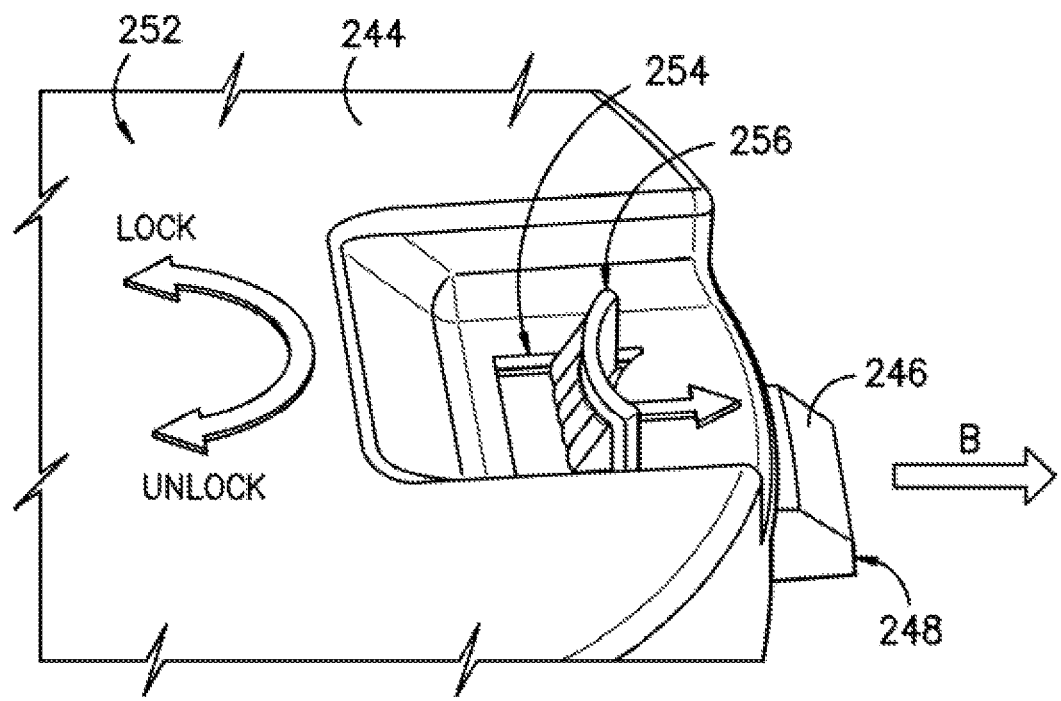
FIG. -14-
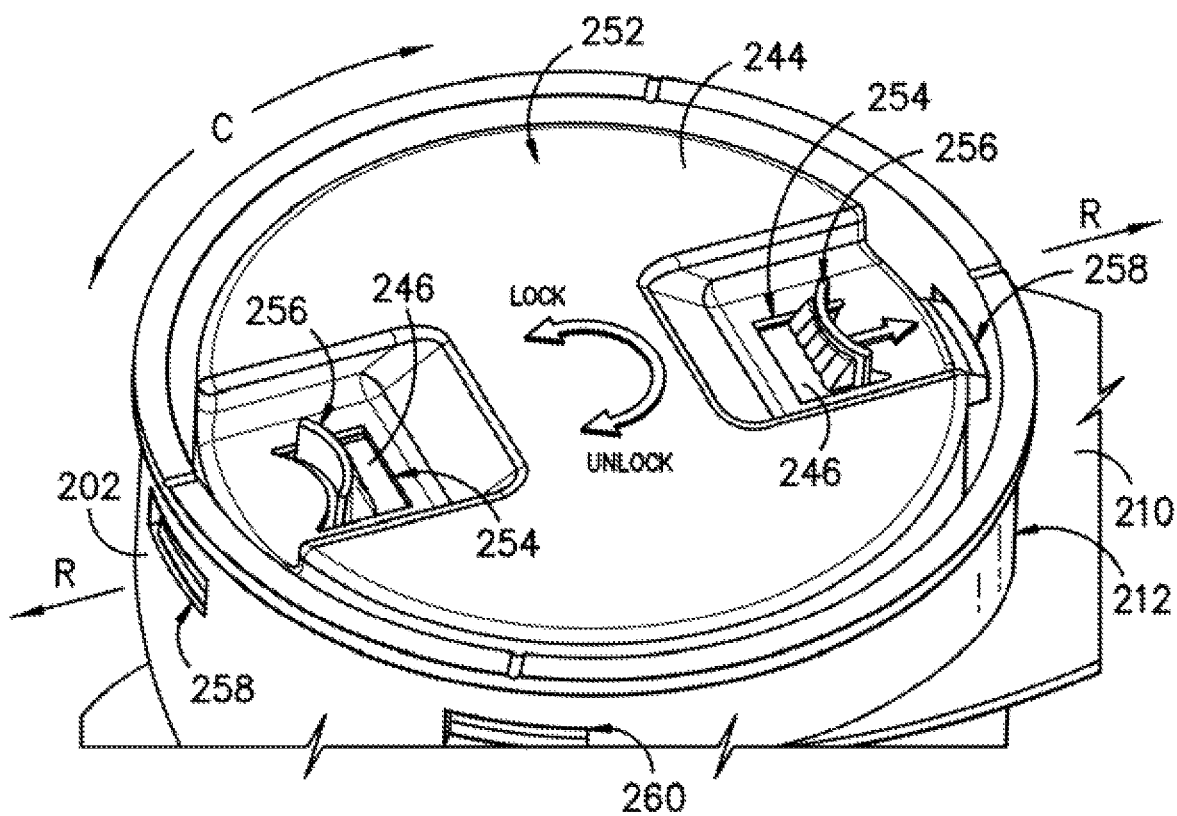
FIG. -15-

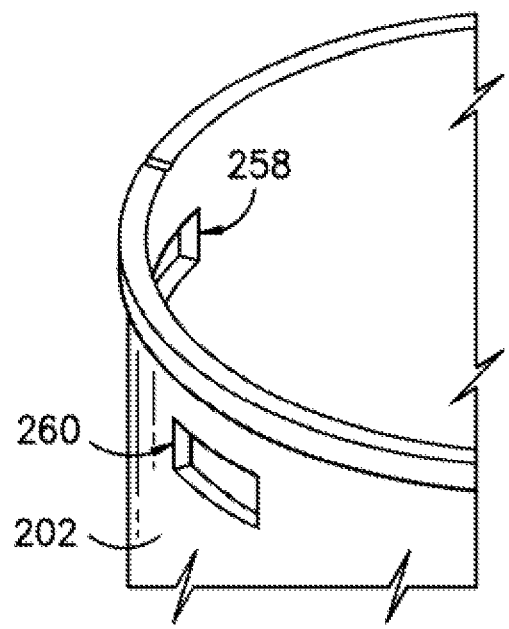
FIG. -16-
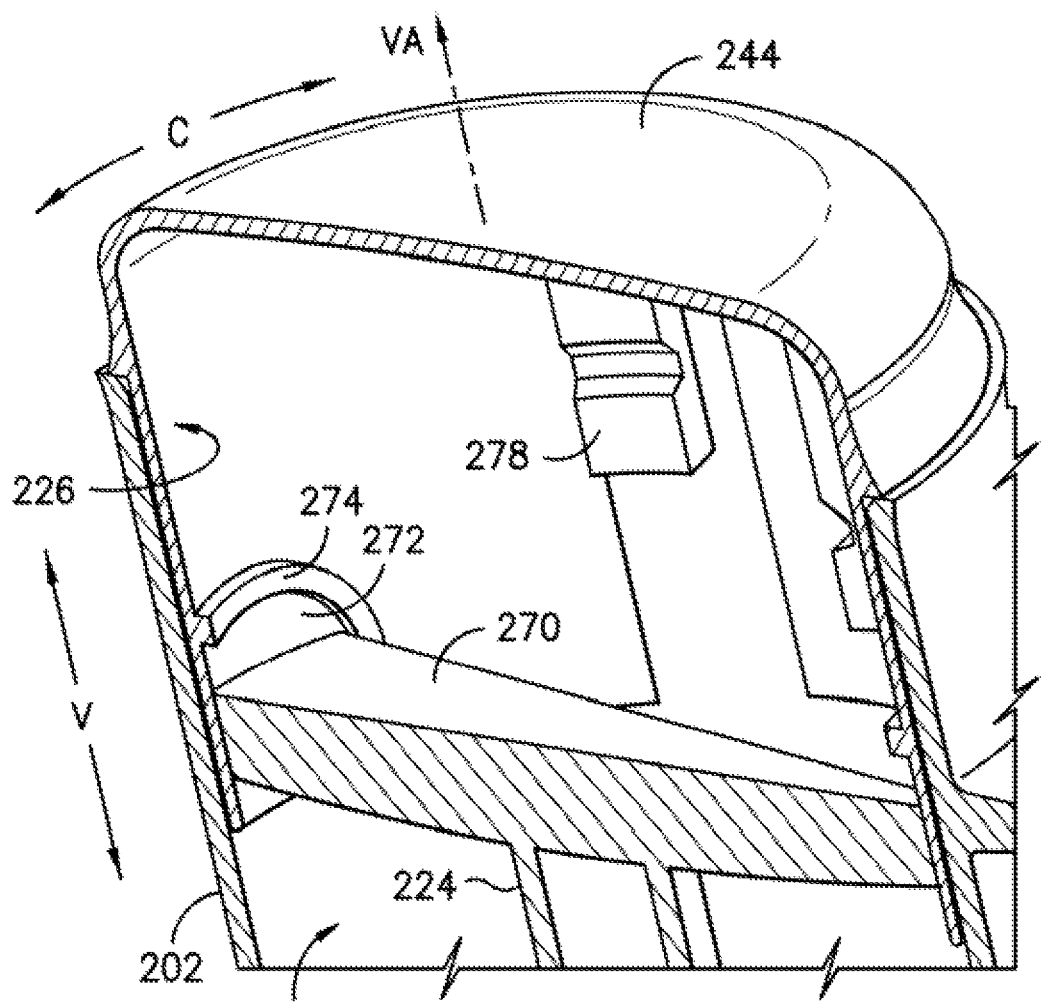
FIG. -17- ing # WASHER APPLIANCE HAVING REMOVABLE AGITATOR POST WITH RADIAL LOCKING FEATURES

FIELD OF THE INVENTION

The subject matter of the present disclosure relates generally to a washer appliance having a removable agitator post.

BACKGROUND OF THE INVENTION

Washing appliances (also referred to as "washing machines") typically include a drum or basket for receipt of articles to be washed. Top-load or vertical axis washing machines rotate the drum about the vertical axis at various points during the cleaning cycle. Various components provide for adding fluid into the drum and for imparting motion to the fluid and articles being washed in order to clean the articles.

Conventionally, the washing appliance may include a knob or other switch by which the user selects the level of fluid in the vertical axis washing machine based on e.g., the load size of articles being washed. The user visually determines the desired fluid level based on the anticipated load size. Many washing appliance users are also accustomed to seeing a conventional agitator in the form of a post extending up from the bottom of the wash basket and configured to impart motion to the fluid and articles during the cleaning cycles. Users may associate factors such as fluid level and movement of the agitator as directly related to the effective cleaning of the articles and may believe that increased fluids levels and agitator action are advantageous.

Certain articles may require more wash space within the wash drum. For example, large garments, pillows, comforters and the like may require more volume for washing than typical articles of clothing. Sufficient space is required in order for the washing appliance to be able to impart motion to the articles and wash fluid as part of the cleaning process. Conventional agitator designs having a post that extends into the wash basket necessarily consume at least part of this space. In addition, in such designs the agitator is typically not designed for removal by the user of the appliance.

Improvements in technology and increasing water conservation requirements have resulted in washing appliances that can use less water during the cleaning cycle and may use features other than the conventional post-type agitator for imparting the desired movement of the articles within the wash basket or wash drum. For example, rotatable impellers have been developed that can impart the desired movement while consuming less volume inside the wash drum than the conventional agitator. Some washing appliances utilizing such designs may also be able to use less water during the cleaning cycle as well.

However, user perception of washing machine features that provide for the best cleaning experience may contradict the actual impact of such features. As previously mentioned, consumers familiar with a conventional post-type agitator extending vertically from the bottom of the wash drum may be reluctant to purchase or use a vertical-axis washing appliance lacking such feature. Yet, depending on the particular design employed, an impeller located at the bottom of the wash drum may have more impact in creating the desired agitation and cleaning of articles than the conventional agitator—including under conditions of less water usage. And for larger loads or loads with larger articles, the space consumed by the conventional post-type agitator is needed for the articles.

Accordingly, a washing appliance with a removable agitator would be useful. More particularly, a washing appliance that allows the user to readily install or remove an agitator while still providing for effective cleaning of articles would be beneficial. Such as washing appliance that can allow of the installation or removal without requiring special tools would be particularly beneficial.

BRIEF DESCRIPTION OF THE INVENTION

Additional aspects and advantages of the invention will be set forth in part in the following description, or may be apparent from the description, or may be learned through practice of the invention.

In one exemplary embodiment, the present invention provides a washing appliance including a cabinet and a wash tub positioned in the cabinet and defining a wash chamber. A wash drum is rotatably mounted within the wash chamber and is configured for receiving articles for washing. An impeller is positioned in the wash drum, the impeller being rotational about a vertical axis and configured for imparting motion to the articles during washing. A receptacle is supported by the impeller, the receptacle including a recess and providing a plurality of openings spaced circumferentially around the recess. An agitator post is configured for removable positioning in the receptacle, the agitator post having a top end and a bottom end, the agitator post defining an interior.

A shaft may be positioned in the interior of the agitator post and extend between the top end and the bottom end, the shaft being rotatable relative to the agitator post, the shaft having an upward end and a downward end. A plurality of movable tabs may be positioned at the downward end of the rotatable shaft and spaced apart along a circumferential direction. The plurality movable tabs may be configured for movement along a radial direction between i) an extended position within the plurality of openings and ii) a retracted position not within the plurality of openings. The movement of the plurality of movable tabs is based on a direction of rotation of the shaft.

In another exemplary embodiment, a washing appliance is provided that includes a wash tub positioned in a wash chamber. A wash drum is rotatably mounted within the wash chamber and configured for receiving articles for washing. An impeller is positioned in the wash drum, the impeller being rotational about a vertical axis and configured for imparting motion to the articles during washing. A receptacle may be supported by the impeller. An agitator post is included having a top end and a bottom end. The bottom end is configured for removable receipt in the receptacle.

A shaft may be supported by the agitator post, the shaft rotatable relative to the agitator post. A plurality of movable tabs may be positioned at the bottom end of the agitator post and in mechanical communication with the shaft such that a direction of rotation of the shaft causes the plurality of movable tabs to be selectively movable along a radial direction between i) an extended position in contact with the receptacle that prevents rotation of the agitator post relative to the receptacle and ii) a retracted position that allows rotation of the agitator post relative to the receptacle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a partial perspective view of an exemplary embodiment of a washing machine of the present invention.

FIG. 2 provides a front cross-sectional view of the exemplary washing machine of FIG. 1.

FIG. 3 provides an exploded perspective view of an exemplary article movement mechanism.

FIG. 4 provide a partial perspective view of a downward end of an exemplary shaft of the present invention depicted in a locked position. An unlocked position is depicted in FIG. 5.

FIG. 6 depicts a portion of an exemplary impeller of the present invention.

FIG. 7 depicts a portion of the exemplary impeller of FIG. 6 and the exemplary shaft of FIGS. 4 and 5 in an unlocked position.

FIG. 8 depicts a locked position.

FIG. 9 depicts a bottom end of an exemplary agitator post of the present invention with a portion removed for purposes of illustration.

FIG. 10 illustrates a cross-sectional perspective view of a bottom end of an exemplary agitator post within an exemplary receptacle supported by the impeller of FIG. 6.

FIG. 11 depicts the downward end of another exemplary shaft as may be used with an exemplary article movement mechanism of the present invention.

FIG. 12 is a top down view of another exemplary agitator post in which exemplary features within the interior at the bottom end are visible.

FIG. 13 is a view of an exemplary actuator and related components shown disassembled for purposes of illustration.

FIG. 14 is a close-up, perspective view of a portion of the exemplary actuator, and FIG. 15 is another perspective view of the same.

FIG. 16 is a partial perspective view of a portion of the top end of the exemplary agitator post of FIG. 3.

FIG. 17 is a cross-sectional view of the top end of another exemplary agitator post and actuator of the present invention.

The use of the same or similar reference numbers in the figures denotes same or similar features unless the context indicates otherwise.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations.

FIGS. 1 and 2 illustrate an exemplary embodiment of a vertical axis washing appliance 100 of the present invention, which is also sometimes referred to as a top loading or vertical axis washing machine. The present invention is not limited to the particular vertical axis washing appliance 100 shown in the figures. Using the teachings disclosed herein, one or skill in the art will understand the other embodiments of a washing machine are also in the scope of the present invention.

In FIG. 1, a door 103 (shown in FIG. 2) has been removed for purposes of illustrating other features of the invention. Washing machine appliance 100 has a cabinet 104 that extends between a top portion 106 and a bottom portion 108 along the vertical direction V, between a first side (left) 110 and a second side (right) 112 along the lateral direction L, and between a front 114 and a rear 116 along the transverse direction T. Cabinet 104 is generally configured for containing and/or supporting various components of appliance 100 and may also define one or more internal chambers or compartments of appliance 100. In this regard, as used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present subject matter.

As best shown in FIG. 2, a wash tub 118 is positioned within cabinet 102, defines a wash chamber 120, and is generally configured for retaining wash fluids during an operating cycle. A wash drum 122 is rotatably mounted within wash chamber 120 of wash tub 118. Washing machine appliance 100 further includes a dispenser 124 for dispensing wash fluid into wash tub 118. In addition, appliance 100 may include one or more additional dispensers for directing fluid into wash tub 118 and each dispenser may be separately controlled by one or more valves controlling flow to each dispenser independently of the others. The term "wash fluid" refers to a liquid used for washing and/or rinsing articles during an operating cycle and may include any combination of water, detergent, fabric softener, bleach, and other wash additives or treatments. As used herein, the term "cleaning cycle" includes a wash cycle, rinse cycle, spin cycle, or combinations thereof.

Wash drum 122 and cabinet 104 generally define an opening 126 (accessible through door 103) for receipt of articles for washing. Wash drum 122 rotates about a vertical axis of rotation VA (FIGS. 2, 3, and 4) powered by motor assembly 128. According to the illustrated embodiment, the axis of rotation VA is substantially parallel to the vertical direction V.

As illustrated, cabinet 104 of washing machine appliance 100 has a top panel 130. Top panel 130 defines an opening (FIG. 1) that coincides with opening 126 of wash tub 118 to permit a user access to wash drum 122. Door 103 is rotatably mounted to top panel 130 to permit selective access to opening 126. In particular, door 103 selectively rotates between a closed position and an open position. In the closed position, door 103 inhibits access to wash drum 122. Conversely, in the open position, a user can access wash drum 122. Although door 103 is illustrated as mounted to top panel 130, door 103 may alternatively be mounted to cabinet 104 or any other suitable support.

As best shown in FIG. 2, wash drum 122 further defines a plurality of perforations 132 to facilitate fluid communication between an interior of wash drum 122 and wash tub 118. In this regard, wash drum 122 is spaced apart from wash tub 118 to define a space for wash fluid to escape wash chamber 120. During a spin cycle, wash fluid within articles being washed (e.g., clothing) and within wash chamber 120 is urged through perforations 132 wherein it may collect in a sump 134 defined by wash tub 118. Washing machine appliance 100 further includes a pump assembly 148 (FIG. 2) that is located beneath wash tub 118 and wash drum 122 for gravity assisted flow when draining wash tub 118.

An exemplary article movement mechanism 200, including impeller 204 (FIGS. 2 and 3) and agitator post 202, is rotatably mounted within wash drum 122 to impart motion to articles and liquid in wash drum 122. More specifically, impeller 204 and agitator post 202 extend into wash drum 122 and assist agitation of articles disposed within wash drum 122 (as will be later described) during operation of washing appliance 100, e.g., to facilitate improved cleaning. For this exemplary embodiment, agitator post 202 includes a helical vane 210 extending from the outer surface 212 of agitator post 202 between bottom end 216 and top end 214 thereof. Helical vane 210 may be configured to assist the agitation of articles or support the overall desired motion thereof during a cleaning cycle. As will be understood by one of skill in the art using teachings disclosed herein, helical vane 210 may have different shapes, thickness, and other features from what is depicted in the figures and may actually include multiples sets of overlapping or non-overlapping vanes.

In different embodiments, impeller 204 and agitator post 202 may rotate separately or together. Such rotations include a single action element (i.e., oscillatory only), a double action element (oscillatory movement at one end, single direction rotation at the other end) or a triple action element (oscillatory movement plus single direction rotation at one end, single direction rotation at the other end). Impeller 204, agitator post 202, and wash drum 122 are oriented to rotate about a vertical axis of rotation VA (which is substantially parallel to vertical direction V). For example, impeller 204 and/or agitator post 202 may rotate back and forth in alternate directions about vertical axis VA during a cleaning cycle. Additional description of the actions of impeller 204 and agitator post 202 are set forth below.

As stated, washing machine appliance 100 includes a motor assembly 128 in mechanical communication with wash drum 122 to selectively rotate wash drum 122 (e.g., during a wash cycle or a rinse cycle of washing machine appliance 100). In addition, motor assembly 128 may also be in mechanical communication with impeller 204 and agitator post 202. For this embodiment, impeller 204 is secured to a shaft 221 from motor assembly 128. In this manner, motor assembly 128 may be configured for selectively and independently rotating or oscillating wash drum 122, impeller 204, and/or agitator post 202 during various operating cycles of washing machine appliance 100.

Referring still to FIGS. 1 through 3, a control panel 138 with at least one input selector 140 (FIGS. 1 and 2) extends from top panel 130. Control panel 138 and input selector 140 collectively form a user interface input for operator selection of machine cycles and features of washing appliance 100. A display 142 of control panel 138 indicates selected features, operation mode, a countdown timer, and/or other items of interest to appliance users regarding operation.

Operation of washing machine appliance 100 is controlled by at least one controller or processing device 146 that is operatively coupled to control panel 138 for user manipulation to select washing machine cycles and features. In response to user manipulation of control panel 138, controller 146 operates the various components of washing machine appliance 100 to execute selected machine cycles and features. According to an exemplary embodiment, controller 146 may include a memory and microprocessor, such as a general or special purpose microprocessor operable to execute programming instructions or micro-control code associated with methods described herein. Alternatively, controller 146 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 138 and other components of washing machine appliance 100 may be in communication with controller 146 via one or more signal lines or shared communication busses.

During operation of washing machine appliance 100, laundry items are loaded into wash drum 122 through opening 126, and washing operation is initiated through operator manipulation of input selector 140. Water, detergent and/or other fluid additives can be added to wash tub 118 and wash drum 122 through dispenser 124 and/or other dispensers as well. Controller 146 can operate one or more valves of washing appliance 100 to provide for filling wash tub 118 and wash drum 122 to the appropriate level for the amount of articles being washed and/or rinsed. By way of example for a wash mode, once wash drum 122 is properly filled with fluid, the contents of wash drum 122 can be agitated (e.g., with article movement mechanism 200 as discussed previously) for washing of laundry items in wash drum 122. The specific operation of wash appliance 100 by controller 146 will depend on various inputs including the cycle and other settings that may be selected by the user, the amount of article placed in wash chamber 120, and other variables as will be understood by one of skill in the art using the teachings disclosed herein.

By way of continuing example, after wash tub 118 is filled and the agitation phase of the wash cycle is completed, wash tub 118 and drum 122 can be drained, e.g., by drain pump assembly 148. Laundry articles can then be rinsed by again adding fluid to wash drum 122 and tub 118 again depending on the specifics of the cleaning cycle selected by a user. The impeller 204 and/or agitator post 202 may also provide agitation within wash drum 122. One or more spin cycles may also be used as part of the cleaning process. In particular, a spin cycle may be applied after the wash cycle and/or after the rinse cycle in order to wring wash fluid from the articles being washed. During a spin cycle, wash drum 122 is rotated at relatively high speeds to help wring fluid from the laundry articles through perforations 132. After articles disposed in wash drum 122 are cleaned and/or washed, the user can remove the articles from wash drum 122, e.g., by reaching into wash drum 122 through opening 126.

As will now be further described, the exemplary article movement mechanism 200 allows desired movements to be imparted to articles in wash drum 122 during a cleaning cycle. These movements, which can include combinations of movement along vertical direction V and radial direction R, assist in cleaning articles while in the wash fluid. One exemplary pattern of movement will now be described. Using the teachings disclosed herein, one of skill in the art will understand that other patterns or paths of fluid and/or article movement in drum 122 may be used as well in other embodiments of the invention.

For example, after articles to be cleaned and fluid are loaded into cylindrical wash drum 122, rotations of impeller 204 may impart an inverse toroidal motion to articles in wash drum 122 during a cleaning cycle. In such motion, articles may move vertically upward from impeller 204 along agitator post 202 and then radially outward (the radial direction is indicated by arrow R in FIG. 3, which is a direction perpendicular to vertical axis VA) at the top of an article load towards the cylindrical portion 123 of wash drum 122.

The articles then move vertically downward towards impeller 204 and radially inward along the bottom of an article load towards agitator post 202 where the cycle repeats under the influence of components such as impeller 204. Accordingly, during a cleaning cycle, this inverse toroidal motion results generally in a turnover of articles in wash drum 122. As used herein, "inverse toroidal motion" or "inverse toroidal movement" does not refer to the specific movement necessarily of any individual article but to the overall movement of articles in wash drum 122 instead. A variety of factors create the inverse toroidal motion the occurs in wash drum 122 including, for example, the relative amounts of fluid and articles present in drum 122, the shape of wash drum 122, the configuration and movements of agitator post 202, the configuration and movements of impeller 204, and other factors as well.

With reference to FIGS. 2 and 3, for this exemplary embodiment of mechanism 202, impeller 204 includes a plurality of radial lobes 206 spaced apart along circumferential direction C. Each lobe 206 has thickness T as measured along the circumferential direction C that varies moving along radial direction R. For the exemplary embodiment shown, thickness T narrows and then widens moving along radial direction R and away from agitator post 202. Each lobe 206 also has a height H above impeller base 208 along axial direction A that also varies along radial direction R. For the exemplary embodiment shown, height H gradually decreases moving along radial direction R and away from agitator post 202. Impeller 204 as depicted in FIGS. 2 and 3 is provided by way of example only. Other shapes and configurations may be used as well.

As noted, the configuration of impeller 204 assists in creating the desired movement of fluid and/or articles within wash drum 122. Article movement mechanism 200 also includes agitator post 202, which may assist in providing or supporting the desired movement. In addition, using features as will also be described, agitator post 202 can be readily installed or removed by a user of appliance 100 without the use of special tools. Removal of agitator post 202 allows more volume within wash drum 122 for the receipt of articles and/or fluid. At the same time, agitator post 202 can be readily installed as may be needed for a particular movement of articles in drum 122 or as may be based on e.g., user preference. An exemplary embodiment of agitator post 202 is set forth in the figures and will now be further described.

For this exemplary embodiment, bottom end 216 of agitator post 202 is removably received in a recess 220 defined by a receptacle 218. Receptacle 218 may be formed as an integral portion of impeller 204 or may be a separate component connected therewith. The shape and depth of receptacle 218 along vertical direction V may vary from what is shown. For this exemplary embodiment, receptacle 218 has a plurality of openings 222 evenly spaced about recess 220 along circumferential direction C.

Referring now to FIGS. 3 through 10, a shaft 224 is positioned in the interior 226 of agitator 202 and supported thereby. In this embodiment, shaft 224 extends along vertical direction V between an upward end 228 and a downward end 230. Shaft 224 is rotatable along circumferential direction C relative to agitator post 202. Such rotation is caused by a user manipulating an actuator 244 received at top end 214 of agitator post 202. Actuator 244 is connected with upward end 228 of shaft 224 such that rotation of actuator 244 causes shaft 224 to also rotate. Actuator 244 is rotatable relative to agitator post 202.

A plurality of movable tabs 232 are positioned at downward end 230 of rotatable shaft 224. Tabs 232 are spaced apart along circumferential direction C and are movable back and forth along radial direction R, which is caused by rotations of shaft 224 clockwise and counter-clockwise along circumferential direction C using actuator 244. Tabs 232 are movable between an extended position shown in (FIGS. 4 and 8) and a retracted position shown in (FIGS. 5 and 7) depending upon the direction of rotation of shaft 224 and actuator 244.

In the extended position, tabs 232 are pushed out radially into openings 222 spaced about receptacle 218. As such, the extended position locks agitator post 202 into receptacle 21. This prevents agitator post 202 from being removed from receptacle 218 and also provides for the transfer of torque to agitator post 202 as impeller 204 rotates during cleaning operations. Lugs 292 positioned at bottom end 216 of agitator post 202 also assist in removably fixing agitator post 202 into receptable 218.

In the retracted position, agitator post 202 is unlocked from receptacle and therefore may be inserted into, or removed from, recess 220 of receptacle 218.

A cam 238 is positioned at downward end 230 of shaft 224. For this exemplary embodiment, cam 238 and shaft 224 are integrally formed. However, in other exemplary embodiments, cam 238 and shaft 224 may be separate components connected directly or indirectly. Cam 238 defines an aperture 280 through which a boss 282 is inserted during assembly (FIG. 10). Cam 238 is rotatable about boss 282, which extends vertically upward from bottom end 216 within interior 226 of agitator post 202.

Cam 238 includes a plurality of slots 240 that each define a path controlling the movement of tabs 232. Each slot 240 and its corresponding path are offset from the radial direction in that slots 240 are not parallel to radial direction R and instead form an angle from radial direction R as best viewed in FIGS. 4 and 5. In addition, for this embodiment, slots 240 provide a slightly arcuate or curved path. Other shapes and angles for slots 240 may be used as well—including a different number of slots depending upon the number of tabs 232.

A plurality of pins 242 are positioned about cam 238 with each pin 242 extending vertically upward from a respective tab 232 and to be slidingly received within one of the slots 240. Each tab 232 is movable back and forward within a respective channel 236 defined by fixed guides 234 (FIG. 9). For this exemplary embodiment, fixed guides 234 are connected to agitator post 202 at bottom end 216 and extend along radial direction R orthogonally to each other. Other orientations, including non-orthogonal, may be used as well. Guides 234 are "fixed" in that such do not move relative to bottom end 216.

Rotation of shaft 224 using actuator 244 causes cam 238 to rotate, which in turn applies a force to pins 242. Referring to FIG. 4, rotation of cam 238 in the direction of arrow CW causes tabs 232 to move radially inward (depicted by arrow RI) to the retracted position as pins 242 travel (e.g., slide) inwardly along the paths provided by slots 240. Referring to FIG. 5, rotation of cam 238 in the direction of arrow CCW causes the tabs 232 to move radially outward (depicted by arrow RO) to the extended position as pins 242 travel outwardly along the path provided by slots 240. In other embodiments of the invention, the orientation of slots 240 in cam 238 may be configured to provide the opposite action where e.g., rotation in the direction of arrow CW causes tabs 232 to move radially outward. Additionally, although four are shown, different number of tabs 232 and corresponding slots 240, pins 242, and channels 236 may be used as will be understood by one of skill in the art using the teachings disclosed herein.

In an alternative embodiment, fixed guides 234 are not connected to bottom end of agitator post 202. Instead, referring to FIGS. 11 and 12, fixed guides 234 may be rotatably connected to a bottom side 284 of cam 238. In this embodiment, fixed guides 234 are part of a guide member 288 having a central opening 286. A plurality of fingers 266 extend from bottom surface 284 through central opening 286. Each finger 266 is slidably received onto a recessed surface 290 surrounding central opening 286. Cam 238 is rotatable relative to guide member 288 and its fixed guides 234. Once shaft 224 and agitator post 202 are assembled, fixed guides 234 are received into channels 264 formed by tracks 262 at bottom end 216 of this embodiment of agitator post 202, which prevents rotation of guide member 288 so that cam 238 may rotate relative thereto. As with the previous exemplary embodiment, tabs 232 are movable along radial direction R within channels 236 formed by fixed guides 234. Rotation of actuator 244 rotates shaft 224 to moved tabs 232 between the retracted and extended positions as previously described.

An exemplary embodiment of actuator 244 is depicted in FIGS. 13, 14 and 15. Referring now to FIGS. 13 through 16, actuator 244 includes a plurality of detents 246 each having an angled tip 248. Detents 246 are selectively movable along radial direction R between a locked position shown in FIG. 14 and an unlocked position shown in FIG. 15.

In the locked position, detents 246 extend into apertures 258 (FIG. 16) defined by agitator post 202 and prevent rotation of actuator 244 and shaft 224 relative to agitator post 202. Additionally, in this locked position, movable tabs 232 are extended into openings 222 such that agitator post 202 is locked into receptable 218.

In the unlocked position, the position of actuator 244 is rotated relative to the locked position so that movable tabs 232 extend into apertures 260 (FIG. 16) defined by agitator post 202 and again prevent rotation of actuator 244 and shaft 224 relative to agitator post 202. However, in this unlocked position, movable tabs 232 are retracted from openings 222 such that agitator post 202 can be removed from receptable 218. A user can select between the locked an unlocked positions of actuator 244 depending upon whether the user intends to secure or remove agitator post 202 from receptacle 218. Indicia on top surface 252 may be provided to aid the user.

Actuator 244 includes biasing elements 250 that urge detents 246 radially outward as depicted by arrow B in FIG. 14. For this exemplary embodiment, biasing elements 250 are constructed from a pair of springs 250 but other constructions with different components may be used as well. Each detent 246 includes a switch 256 that extends vertically upward through a slot 254 defined in the top surface 252 of the actuator 244. In order to rotate actuator 244 between the locked and unlocked positions, the user can use e.g., fingers to move both switches 256 radially inward, which moves detents 246 out of apertures 258 or 260. Upon releasing switches 256, biasing elements 250 will cause detents 246 to extend into apertures 258 or 260 once aligned with one or the other depending upon whether the user desires to lock or unlock agitator post 202.

FIG. 17 depicts another exemplary embodiment of actuator 244 and shaft 224. In this embodiment, as with previous embodiments, actuator 244 can be rotated relative to agitator post 202 so determine the rotational position of cam 238 and thereby control whether tabs 232 are extended or retracted. However, this embodiment does not included switches. Instead, a projection 274 extends from interior surface 276 of agitator post 202 to define a pocket 272 for the receipt of a lock 270 connected with upward end 228 of shaft 224. Accordingly, rotation of actuator 244 will also rotate shaft 224 to rotate and operate cam 238 as previously described.

Actuator 244 includes one or more tabs 278 that extend vertically downward and into contact with the interior surface 276 to secure actuator 244 to agitator post 202.

Accordingly, article movement mechanism 200 is equipped with an agitator post 202 (described with exemplary embodiments herein) that may be selectively removed or installed as desired by a user. Depending upon user preferences, the need for additional space for articles in wash chamber 120, or other factors, appliance 100 allows the user to decide when agitator post 202 will be utilized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing appliance, comprising:
   a cabinet;
   a wash tub positioned in the cabinet and defining a wash chamber;
   a wash drum rotatably mounted within the wash chamber and configured for receiving articles for washing;
   an impeller positioned in the wash drum, the impeller being rotational about a vertical axis and configured for imparting motion to the articles during washing;
   a receptacle supported by the impeller, the receptacle including a recess and providing a plurality of openings spaced circumferentially around the recess;
   an agitator post configured for removable positioning in the receptacle, the agitator post having a top end and a bottom end, the agitator post defining an interior;
   a shaft positioned in the interior of the agitator post and extending between the top end and the bottom end, the shaft being rotatable relative to the agitator post, the shaft having an upward end and a downward end;
   a plurality of movable tabs positioned at the downward end of the shaft and spaced apart along a circumferential direction, the plurality movable tabs configured for movement along a radial direction between i) an extended position within the plurality of openings and ii) a retracted position not within the plurality of openings, wherein the movement of the plurality of movable tabs is based on a direction of rotation of the shaft;
   a cam positioned at the downward end of the shaft, the cam having a plurality of slots, each slot defining a path that is offset from the radial direction; and
   a plurality of pins, each pin extending from one of the plurality of movable tabs into one of the plurality of slots and slidable therein during rotation of the shaft.

2. The washing appliance of claim 1, wherein the path is arcuate in shape.

3. The washing appliance of claim 2, further comprising a plurality of fixed guides positioned at the cam, each of the plurality of movable tabs positioned in one of the fixed guides.

4. The washing appliance of claim 3, wherein the plurality of fixed guides are rotatably connected to the cam.

5. The washing appliance of claim 3, wherein the plurality of fixed guides are connected to agitator post.

6. The washing appliance of claim 3, wherein the plurality of fixed guides extend along the radial direction and orthogonally to each other.

7. The washing appliance of claim 1, further comprising an actuator positioned at the top end of the agitator post and rotatable relative to the agitator post, the actuator connected with the upward end of the shaft such that rotation of the actuator also rotates the shaft.

8. The washing appliance of claim 7, further comprising a plurality of detents connected with the actuator, the detents configured for selective movement along the radial direction between i) a locked position in which the detents fix a rotational position of the actuator relative to the agitator post and ii) an unlocked position the allows the actuator to rotate relative to the agitator post.

9. The washing appliance of claim 8, further comprising a plurality biasing elements connected with the actuator and configured to urge the detents into the locked position.

10. The washing appliance of claim 1, wherein the agitator post further comprises a helical vane extending around an outer surface of the agitator post and the impeller comprises a plurality of lobes spaced-apart along a circumferential direction of the impeller.

11. A washing appliance, comprising:
    a wash tub positioned in a wash chamber;
    a wash drum rotatably mounted within the wash chamber and configured for receiving articles for washing;
    an impeller positioned in the wash drum, the impeller being rotational about a vertical axis and configured for imparting motion to the articles during washing;
    a receptacle supported by the impeller;
    an agitator post having a top end and a bottom end, the bottom end configured for removable receipt in the receptacle;
    a shaft supported by the agitator post, the shaft rotatable relative to the agitator post;
    a plurality of movable tabs positioned at the bottom end of the agitator post and in mechanical communication with the shaft such that a direction of rotation of the shaft causes the plurality of movable tabs to be selectively movable along a radial direction between i) an extended position in contact with the receptacle that prevents rotation of the agitator post relative to the receptacle and ii) a retracted position that allows rotation of the agitator post relative to the receptacle;
    a cam connected with the shaft and positioned near the bottom end of the agitator post, the cam having a plurality of slots, each slot defining a path for controlling the movement of the movable tabs; and
    a plurality of pins, each pin extending from one of the plurality of movable tabs into one of the plurality of slots and slidable therein during rotation of the shaft.

12. The washing appliance of claim 11, wherein the path is arcuate in shape.

13. The washing appliance of claim 11, further comprising a plurality of fixed guides positioned at the cam, the each of the plurality of movable tabs positioned in one of the fixed guides.

14. The washing appliance of claim 13, wherein the plurality of fixed guides are connected to the cam.

15. The washing appliance of claim 11, further comprising an actuator received at the top end of the agitator post and rotatable relative to the agitator post, the actuator connected with an upward end of the shaft such that rotation of the actuator also rotates the shaft.

16. The washing appliance of claim 15, further comprising a plurality of detents connected with the actuator, the detents configured for selective movement along the radial direction between i) a locked position preventing the agitator post from being removed from the receptacle and ii) an unlocked position that allows the agitator post to be removed from the receptacle.

17. The washing appliance of claim 16, further comprising a plurality biasing elements connected with the actuator and configured to urge the detents radially outward.

18. The washing appliance of claim 17, wherein the actuator further comprises a top surface defining a plurality of slots, and wherein the detents each comprise a switch extending through the slot whereby a user may selectively manipulate the actuator.

19. The washing appliance of claim 11, wherein each path is non-parallel to the radial direction.

* * * * *